US008439206B2

(12) United States Patent
Beedie et al.

(10) Patent No.: US 8,439,206 B2

(45) Date of Patent: May 14, 2013

(54) CYCLONE APPARATUS

(75) Inventors: Stephen Beedie, Houston, TX (US); Mark Wolf, Katy, TX (US)

(73) Assignee: Merpro Tortek Limited, Angus, Scotland (GB)

( * ) Notice: Subject to any disclaimer, the term of this patent is extended or adjusted under 35 U.S.C. 154(b) by 132 days.

(21) Appl. No.: 12/671,590

(22) PCT Filed: Jun. 4, 2008

(86) PCT No.: PCT/GB2008/001910

§ 371 (c)(1),
(2), (4) Date: Jun. 29, 2011

(87) PCT Pub. No.: WO2009/016332

PCT Pub. Date: Feb. 5, 2009

(65) Prior Publication Data

US 2011/0259819 A1 Oct. 27, 2011

Related U.S. Application Data

(60) Provisional application No. 60/935,168, filed on Jul. 30, 2007.

(51) Int. Cl.
*B01D 21/26* (2006.01)
*B04C 5/28* (2006.01)

(52) U.S. Cl.
USPC ........ 210/512.2; 209/711; 209/728; 209/732; 209/733; 209/734; 55/348; 55/349; 96/211; 96/212

(58) Field of Classification Search ............... 210/512.1, 210/512.2, 787, 788; 209/711, 715, 717, 209/720, 721, 722, 725, 728, 732, 733, 734; 55/345–349; 96/167, 177, 195, 208, 209, 96/211, 212, 216
See application file for complete search history.

(56) References Cited

U.S. PATENT DOCUMENTS

| | | | | |
|---|---|---|---|---|
| 2,360,355 | A * | 10/1944 | McBride et al. | 209/712 |
| 2,622,735 | A * | 12/1952 | Criner | 209/728 |
| 2,671,560 | A * | 3/1954 | Leeman et al. | 209/729 |
| 2,734,630 | A * | 2/1956 | Van der wal | 209/728 |

(Continued)

FOREIGN PATENT DOCUMENTS

| | | |
|---|---|---|
| EP | 1393812 | 3/2004 |
| FR | 2389418 | 12/1978 |
| GB | 2362118 | 11/2001 |

*Primary Examiner* — David C Mellon

(74) *Attorney, Agent, or Firm* — Welsh Flaxman & Gitler LLC

(57) ABSTRACT

A cyclone apparatus for separating a mixture containing at least one fluid and a further constituent based on the densities of the mixture constituents. The apparatus includes a first hollow pressure vessel having an overflow plate positioned at an overflow end of the first hollow pressure vessel and an end plate for sealing the overflow plate. The cyclone apparatus also comprises an underflow plate positioned at an under-flow end of the first hollow pressure vessel and a hollow pressure vessel with one end being sealed against the under-flow plate and another end being closed. The overflow plate and the end plate are shaped such that when they are brought together they form separate adjacent overflow compartments between them. The underflow plate and the second hollow pressure vessel are shaped such that when they are brought together they form separate adjacent under-flow compartments between them which correspond to the overflow compartments.

13 Claims, 7 Drawing Sheets

U.S. PATENT DOCUMENTS

| | | | | | |
|---|---|---|---|---|---|
| 2,765,918 | A | * | 10/1956 | Fontein et al. | 210/512.2 |
| 2,956,679 | A | * | 10/1960 | Hoffmann | 209/711 |
| RE25,099 | E | * | 12/1961 | Hoffmann | 209/711 |
| 3,061,994 | A | * | 11/1962 | Mylting | 55/346 |
| 3,104,961 | A | * | 9/1963 | Westlin | 96/307 |
| 3,261,467 | A | * | 7/1966 | Wikdahl | 209/728 |
| 3,371,794 | A | * | 3/1968 | Johnson | 210/512.2 |
| 3,386,588 | A | * | 6/1968 | Ades | 210/512.2 |
| 3,415,374 | A | * | 12/1968 | Wikdahl | 209/726 |
| 3,425,192 | A | * | 2/1969 | Davis | 55/345 |
| 3,486,618 | A | * | 12/1969 | Wikdahl | 209/711 |
| 3,543,931 | A | * | 12/1970 | Rastatter | 209/728 |
| 3,598,731 | A | * | 8/1971 | Frykhult et al. | 210/94 |
| 3,861,532 | A | * | 1/1975 | Skardal | 209/728 |
| 3,940,331 | A | * | 2/1976 | Rastatter | 209/728 |
| 3,959,123 | A | * | 5/1976 | Wikdahl | 209/728 |
| 3,984,308 | A | * | 10/1976 | Rastatter | 209/728 |
| 4,123,364 | A | * | 10/1978 | Mozley | 210/512.2 |
| 4,148,721 | A | * | 4/1979 | Brown et al. | 209/728 |
| 4,148,723 | A | * | 4/1979 | Mozley | 209/726 |
| 4,208,270 | A | * | 6/1980 | Grieve et al. | 209/728 |
| 4,285,706 | A | * | 8/1981 | Dehne | 55/343 |
| 4,297,111 | A | * | 10/1981 | Ross | 210/788 |
| 4,426,283 | A | * | 1/1984 | Fecske | 209/728 |
| 4,437,984 | A | * | 3/1984 | King et al. | 209/728 |
| 4,537,608 | A | * | 8/1985 | Koslow | 55/337 |
| 4,650,584 | A | * | 3/1987 | Macierewicz | 210/512.2 |
| 4,863,500 | A | * | 9/1989 | Rombout et al. | 55/348 |
| 5,009,785 | A | * | 4/1991 | Webb | 210/512.2 |
| 5,178,648 | A | * | 1/1993 | Kalen et al. | 95/269 |
| 5,194,150 | A | * | 3/1993 | O'Brien et al. | 210/233 |
| 5,336,410 | A | | 8/1994 | O'Brien et al. | |
| 5,337,899 | A | * | 8/1994 | Andersson et al. | 209/728 |
| 5,388,708 | A | * | 2/1995 | Bouchillon et al. | 209/728 |
| 5,447,632 | A | * | 9/1995 | Andersson | 210/512.2 |
| 5,499,720 | A | * | 3/1996 | Bouchillon et al. | 209/728 |
| 5,616,244 | A | * | 4/1997 | Seureau et al. | 210/295 |
| 5,965,022 | A | * | 10/1999 | Gould et al. | 210/512.2 |
| 5,980,639 | A | * | 11/1999 | Trickey et al. | 127/24 |
| 6,129,217 | A | * | 10/2000 | Trickey et al. | 209/727 |
| 6,800,208 | B2 | * | 10/2004 | Bolman | 210/788 |
| 7,011,219 | B2 | * | 3/2006 | Knox-Holmes et al. | 209/725 |
| 8,020,707 | B2 | * | 9/2011 | Kim et al. | 209/711 |
| 2007/0215541 | A1 | * | 9/2007 | Kampfer | 210/512.2 |
| 2008/0099410 | A1 | * | 5/2008 | Sprague | 210/787 |
| 2009/0100810 | A1 | * | 4/2009 | Smith | 55/343 |
| 2009/0321367 | A1 | * | 12/2009 | Sprague | 210/749 |
| 2010/0237023 | A1 | * | 9/2010 | Sprague | 210/758 |

* cited by examiner

CYCLONE APPARATUS

CROSS REFERENCE TO RELATED APPLICATIONS

The present application is the National Stage of International Application No. PCT/GB2008/001910, filed Jun. 4, 2008 entitled "CYCLONE APPARATUS", which claims the benefit of U.S. Provisional Patent Application Ser. No. 60/935,168 filed Jul. 30, 2007, entitled "CYCLONE APPARATUS".

Cyclones have been used to separate solids from air or water for many years. Cyclones, which can separate a mixture of immiscible fluids, generally known as hydrocyclones, have also been developed, in particular to solve the problems of increased water cuts in upstream oil production.

Although, as mentioned above, cyclones can be used to separate solids and/or liquid mixtures, fluid/fluid cyclone separation is the main focus of this discussion. Accordingly, an example of the separation process for a immiscible fluid mixture in a cyclone liner is as follows.

A fluid mixture enters a cyclone tangentially, causing the fluid inside the cyclone to spin. This creates a radial force that directs the heavier phase towards the edges of the cyclone and then out of the cyclone underflow owing to differential pressure. The less dense phase is concentrated in the centre of the cyclone before passing out of the cyclone overflow, again due to differential pressure.

Compared with traditional alternatives, such as settling or skim tanks, a cyclone separator system yields much faster separation within a smaller space. This is because the gravitational force at work in the settling or skim tanks is replaced by radial forces in the cyclone of a far higher magnitude. These high forces mean that cyclones are insensitive to motion and orientation, making them particularly ideal for off-shore applications in the oil industry.

A cyclone apparatus can be used to house one or more cyclone liners, the apparatus generally consisting of a main inlet chamber, where an immiscible fluid mixture, such as oil and water, enters the apparatus, and overflow and underflow chambers, generally arranged either side of the inlet chamber, for the separated fluids to move into.

Generally, overflow and underflow chambers are separated from the inlet chamber by overflow and underflow plates, which are provided with holes through which a plurality of cyclone liners can be fitted. The fluid mixture entering the inlet chamber of the cyclone apparatus is then forced to flow through the cyclone liners. The lighter oil phase exits the cyclone liners into the overflow chamber and the heavier water phase exits the cyclone liners into the underflow chamber.

The nature of cyclone separation is such that a cyclone liners' ability to separate an immiscible fluid mixture has a peak efficiency within a limited flow rate range. A problem with cyclone apparatus, such as that described in U.S. Pat. No. 5,336,410, has always been that as the rate of flow drops below the cyclone's optimum design point, separation efficiency also drops, thereby reducing the effectiveness of the fluid separation system. Cyclones are principally used for the separation of oil from produced water in oil production operations. Initial produced water quantities from an oil reservoir are typically very low with water production increasing over time, therefore it is desirable to have an oil and water separation system that can accommodate a wide flow rate range starting at very low flow rates and increasing over time. Previous systems, such as the one disclosed in U.S. Pat. No. 5,336,410, accomplish such separation by providing a cyclone apparatus with the capacity to hold a large number of cyclone liners, although only a small number of cyclone liners are initially installed for low flow rates. The remaining space is occupied by solid blank liners to prevent fluids from passing from the inlet chamber to the overflow and underflow chambers.

In U.S. Pat. No. 5,336,410, the separating capacity of the cyclone apparatus is increased by disassembling the apparatus and replacing blank liners with active cyclone liners, which is both tedious and time-consuming. An object of the present invention is, therefore, to achieve a wider range of flow rates from a cyclone apparatus without the having to disassemble the cyclone apparatus.

According to the present invention there is provided a cyclone apparatus for separating a mixture containing at least one fluid and a further constituent based on the densities of the mixture constituents, the apparatus comprising: a first hollow pressure vessel open at each end, having at least one inlet located on its body; an overflow plate positioned at an overflow end of the first hollow pressure vessel; an end plate for sealing the overflow plate; an underflow plate positioned at an underflow end of the first hollow pressure vessel; and a second hollow pressure vessel with one end being sealed against the underflow plate and another end being closed, wherein the overflow plate and underflow plate both being provided with through holes for supporting, in use, cyclone liners which pass there through, each cyclone liner having an inlet located between the overflow and underflow plates; and wherein the overflow plate and the end plate are shaped such that when they are brought together they form separate adjacent overflow compartments between them, the overflow outlets of the cyclone liners being located in the overflow compartments, and each overflow compartment having an outlet; and wherein the underflow plate and the second hollow pressure vessel are shaped such that when they are brought together they form separate adjacent underflow compartments between them which correspond to the overflow compartments, the underflow outlets of the cyclone liners being located in the underflow compartments, and each underflow compartment having an outlet.

The present invention, therefore, overcomes the problems of the prior art by separating the overflow and underflow chambers into separate corresponding compartments, with each compartment having its own discharge outlet. Using valves on the outlet for each compartment, the number of cyclone liners through which fluids are allowed to pass can be controlled, thereby providing multiple peak efficiency operating points for the apparatus.

In particular, the cyclone apparatus may be arranged with the overflow and underflow chambers divided into an inner, generally cylindrical, compartment which contains, for example, ⅓ of the total installed cyclone liners and an outer, generally cylindrical, compartment which, therefore, contains ⅔ of the total quantity of cyclone liners installed in the apparatus.

In the above example, a peak operating efficiency would be provided at ⅓, ⅔, and 100% of the total capacity of the apparatus. This allows for the cyclone apparatus to be operated with acceptable efficiency across a broad range of flow rates without the need to disassemble the apparatus in order to change the quantity of cyclone liners installed within. Another advantage of the present invention can be seen when considering the materials used in the construction of the apparatus. In previous systems, multi-chamber designs with extensive pressure boundary bolting and inaccessible enclosed areas presented a problem in that the internal components, which are exposed to the process fluids, cannot be coated. Therefore, the entire apparatus must be constructed of corrosion resistant alloy material.

According to the present invention there is also provided a cyclone apparatus as described above, wherein the end plate and/or the second hollow pressure vessel is externally fixed to the first hollow pressure vessel.

By eliminating inaccessible internal areas and bolting to the pressure retaining components that are exposed to the process fluids, the pressure apparatus can be constructed from lower cost carbon steel materials and coated with a corrosion resistant internal lining, as is the case with the present invention.

Furthermore, the external bolting increases the quantity of cyclone liners that can be installed within each compartment for a given area, thereby increasing total capacity for a given size apparatus. It should also be recognized that cyclones can also be used to remove high volumes of solids from liquids, such as slurry streams, both efficiently and quickly.

An example of the present invention will now be described with reference to the accompanying drawings, in which.

Figure 5:
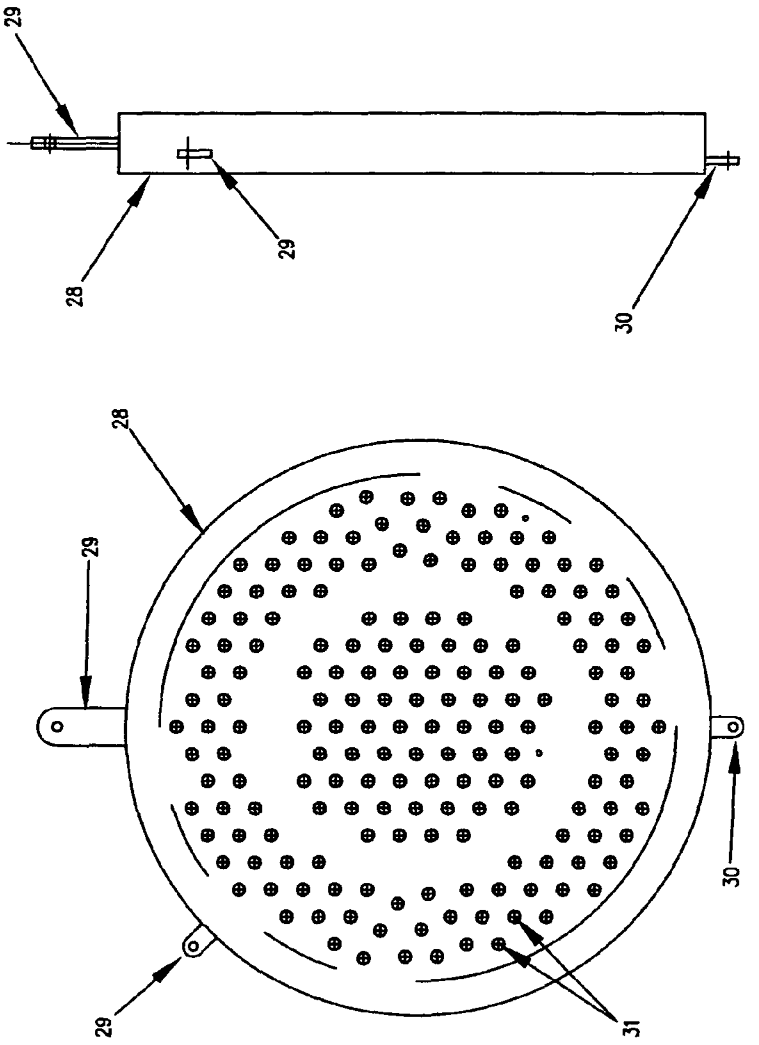
Figure 6:
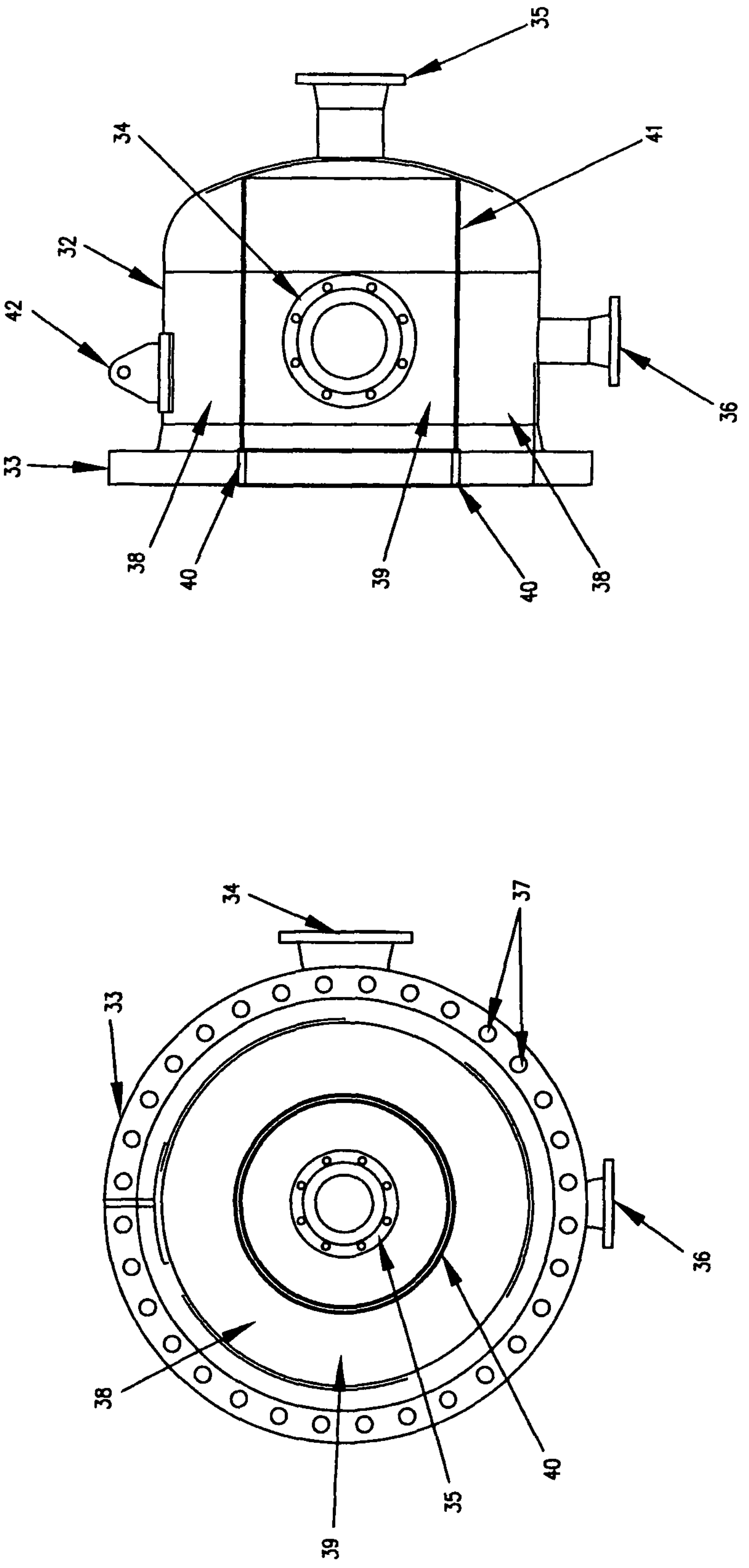

FIG. 5 is a drawing of the underflow plate of the preferred embodiment, illustrating the holes provided for the ends of the cyclone liners to pass through; and FIG. 6 is a drawing of the underflow hollow pressure vessel of the preferred embodiment, illustrating how the apparatus can be separated into multiple cyclone liner compartments, and also the outlet nozzles and the flange for attaching the underflow vessel to the first hollow pressure vessel.

Figure 7:
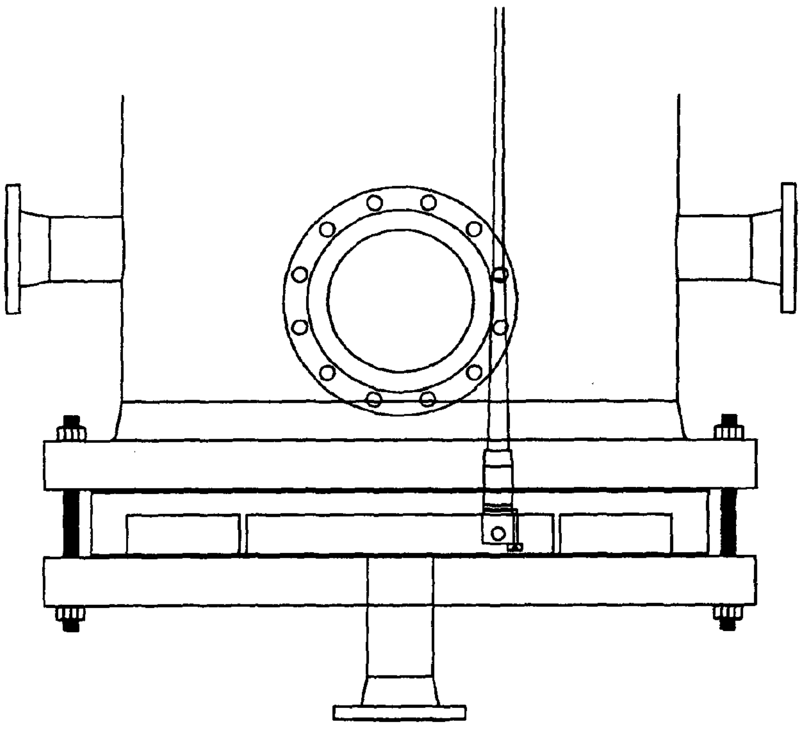

FIG. 7 is a side plan view of the forward end of the cyclone apparatus.

Figure 1:
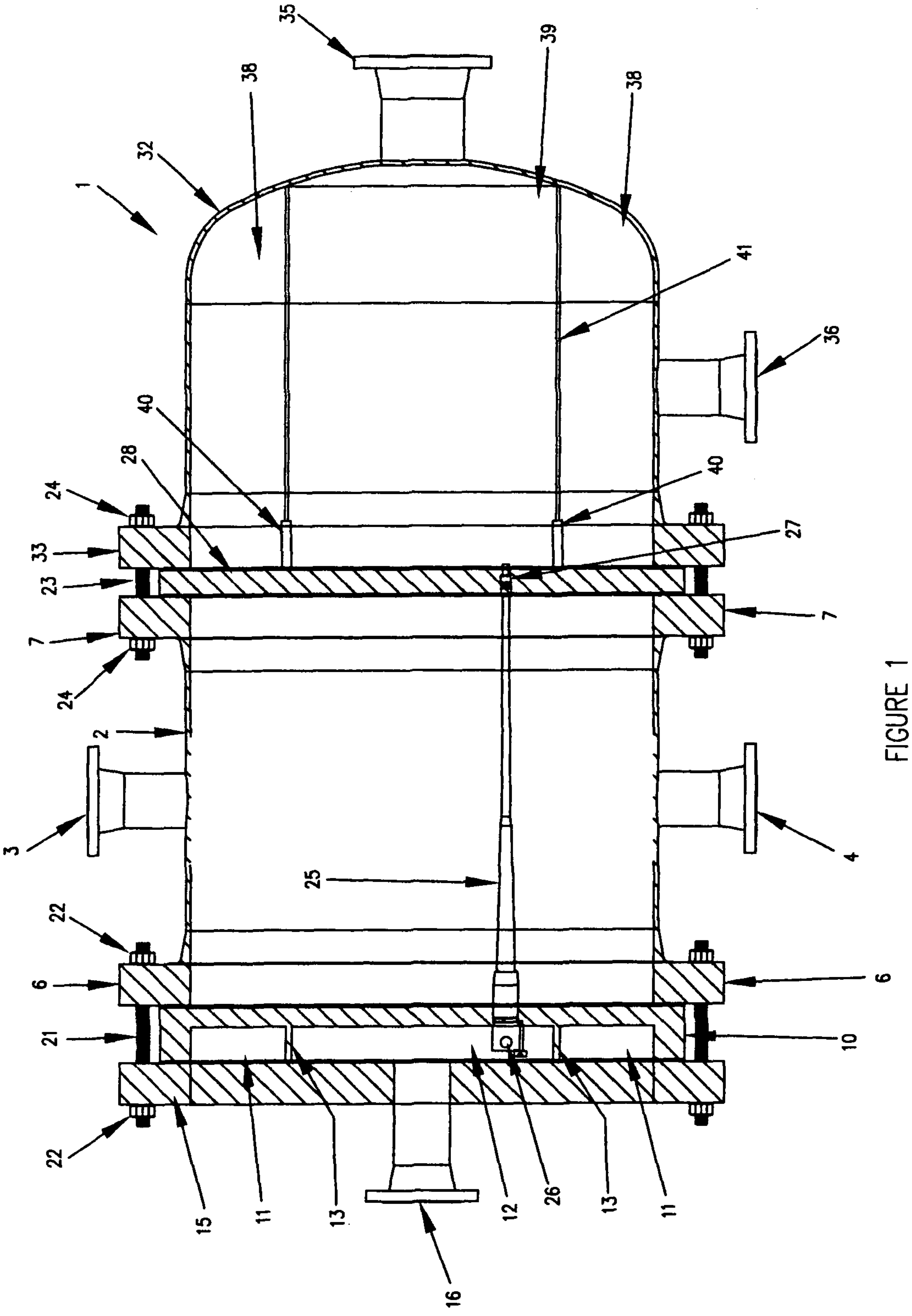
FIG. 1 is a cross sectional diagram of the preferred embodiment, illustrating how the components fit together to create a cyclone apparatus.

Whilst it will be appreciated that cyclone liners can be used to separate a mixture of solids and/or fluids, the following example of the present invention employs cyclone liners for the separation of an immiscible fluid mixture, such as oil and water. Referring to the figures in detail, which show a preferred embodiment of the invention, FIG. 1 shows a cyclone apparatus according to the invention, indicated generally at 1, which is shown as comprising a first hollow pressure vessel 2, a second hollow pressure vessel 32 having a closed end, an end plate 15, an overflow plate 10 and an underflow plate 28, between which a plurality of cyclone liners 25 can be located.

Figure 2:
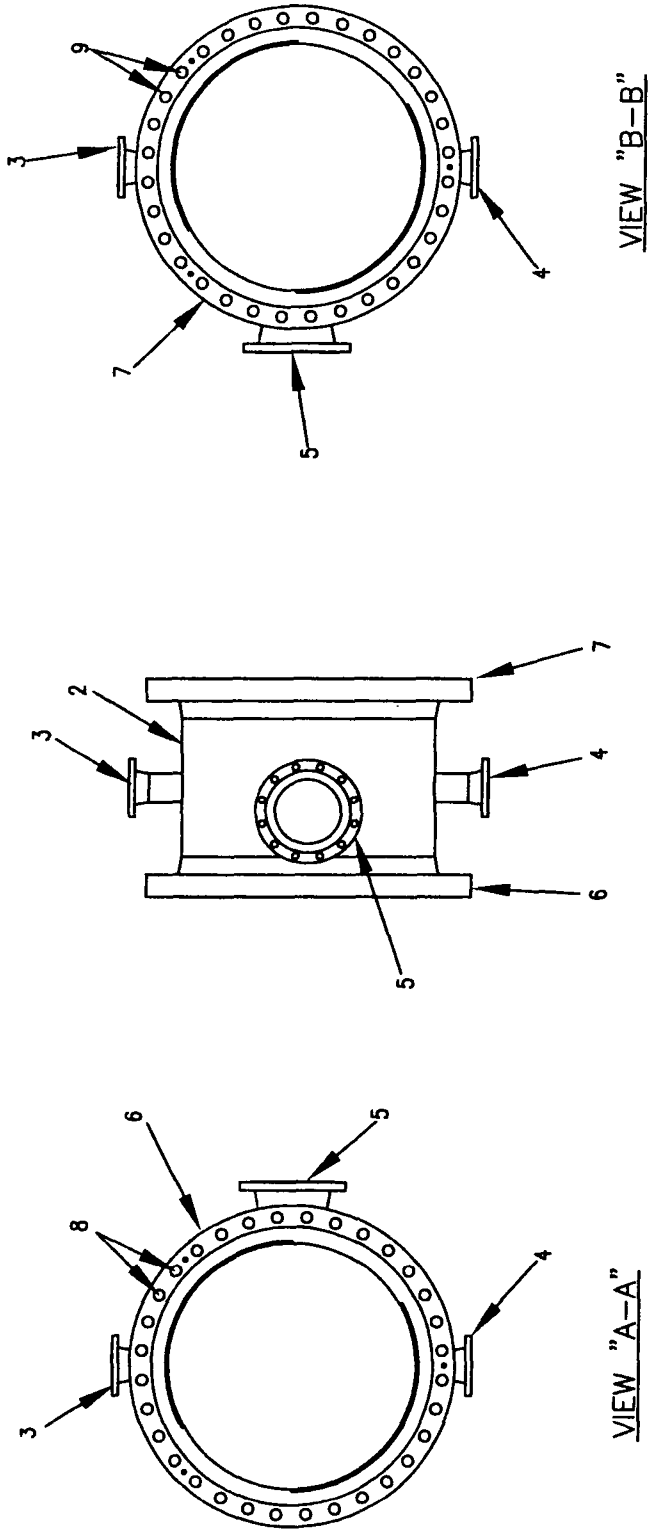
FIG. 2 is a drawing of the inlet hollow pressure vessel of the preferred embodiment, illustrating its inlet and outlet nozzles and also its end flanges.

As illustrated in FIG. 2, the first hollow pressure vessel 2, has an inlet 5 provided for the fluid mixture to enter the first hollow pressure vessel 2, a pressure relief valve connection 3 provided for pressure relief, and a drain outlet 4 provided to drain the first hollow pressure vessel 2. The first hollow pressure vessel 2 is open at both ends, which are shaped to form an overflow flange 6 and an underflow flange 7, respectively. Each of the flanges 6, 7 has holes 8, 9 provided around the circumference for bolts 21, 23 to pass through.

Figure 3:
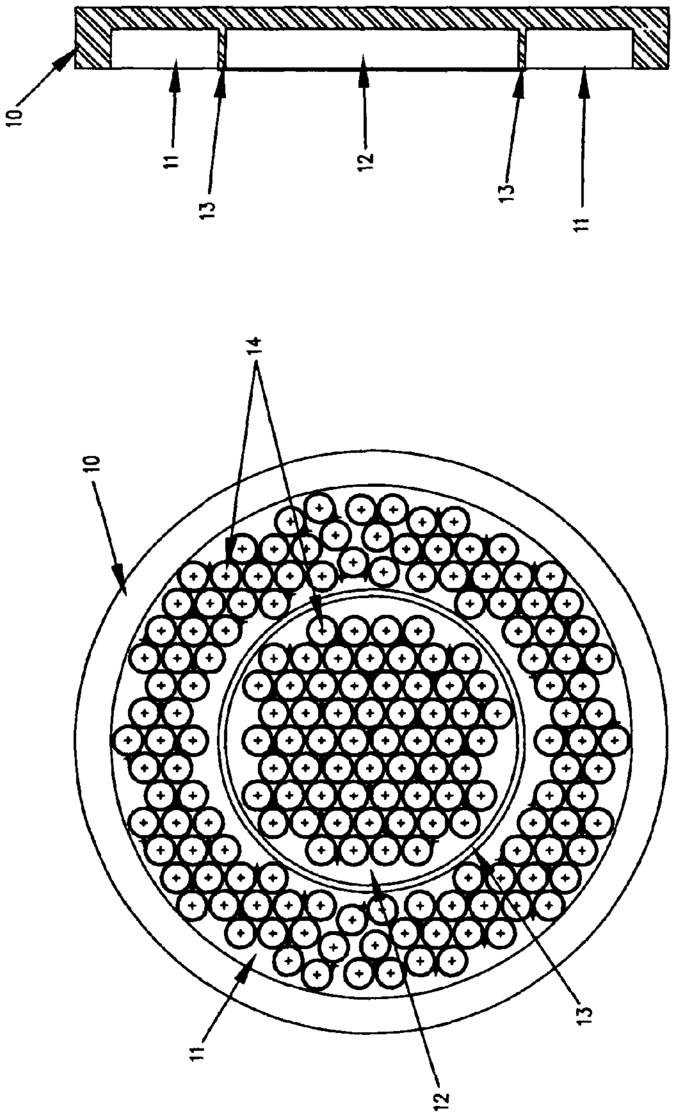
FIG. 3 is a drawing of the overflow plate of the preferred embodiment, illustrating multiple cyclone liner compartments and the holes provided for the ends of the cyclone liners themselves.

The overflow plate 10 is located against the overflow flange 6 of the first hollow pressure vessel 2, the overflow plate 10 having a plurality of holes 14 provided for the cyclone liners 25 to pass through, as shown in FIG. 3. An O-ring seal (not shown) is provided between the cyclone liners 25 and the overflow plate 10 to ensure that no liquid can pass by the outside of the cyclone liners 25.

Furthermore, the cyclone liners 25 are held in place with a three prong bracket and center bolt (not shown) that is secured to the overflow plate 10. In the preferred embodiment, each bracket holds three cyclone liners 25 in place against the overflow plate 10, with each cyclone liner 25 having a shoulder that seats against the overflow plate 10 to prevent the cyclone liner 25 from sliding through.

The end plate 15 is seated against the overflow plate 10, holding the overflow plate 10 in place and creating overflow compartments 11, 12, as shown in FIG. 1, in which the overflow outlets 26 of the cyclone liners 25 are located. The overflow plate 10 of the preferred embodiment is formed to have separate concentric recesses 11, 12, separated by a boundary wall 13. The recesses 11, 12 are generally machined into the overflow plate 10, although it will be appreciated that they could be formed in other ways.

The cyclone liners overflow outlets 26 are located in the overflow compartments 11, 12.

The boundary wall 13 has a groove formed into the top of it, in which packing material, for example an O-ring (not shown), is fitted. When the end plate 15 seats against the overflow plate 10, this packing material creates a seal between the overflow compartments 11, 12.

Figure 4:
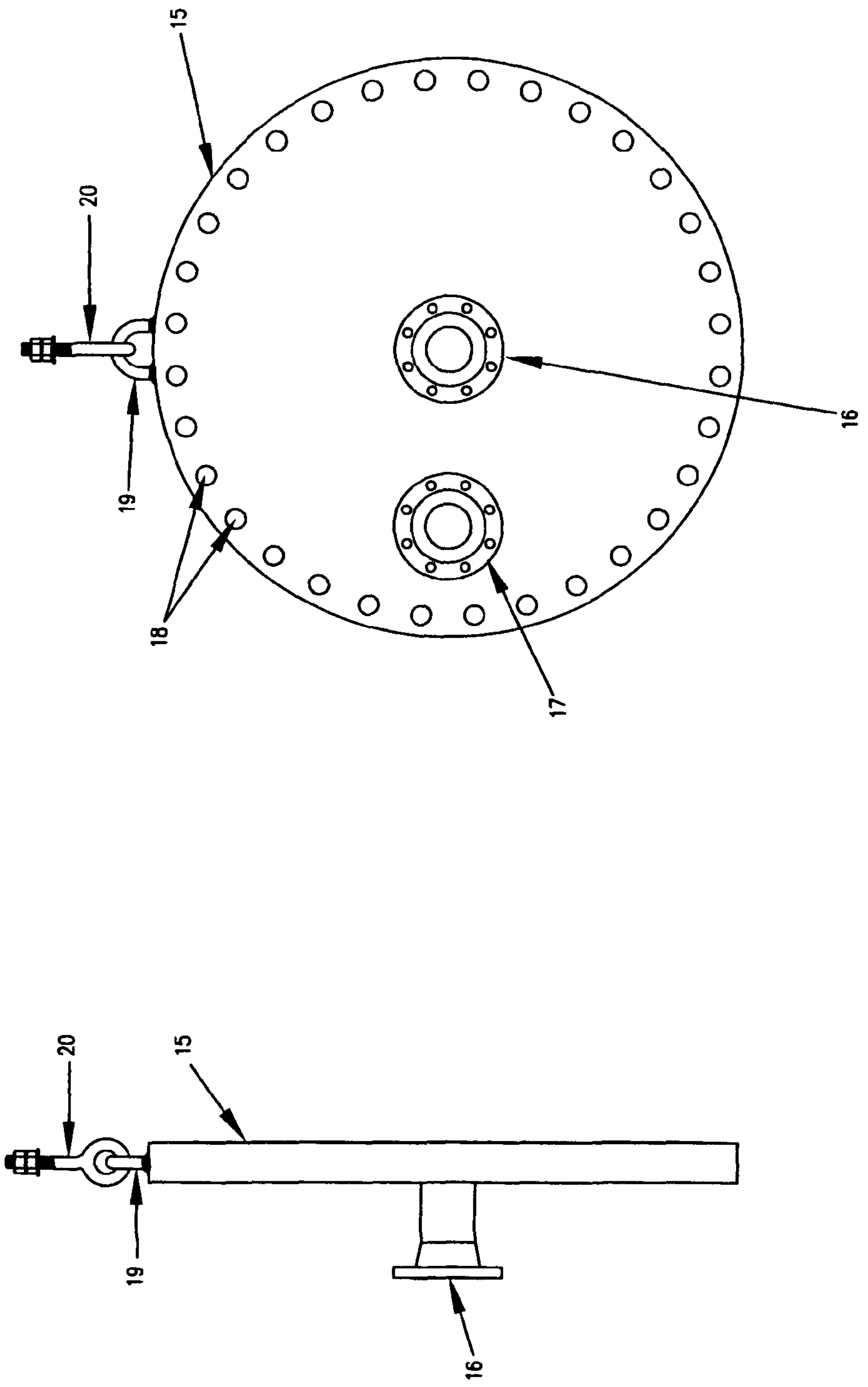
FIG. 4 is a drawing of the end plate of the preferred embodiment, illustrating multiple outlet nozzles and holes provided to attach the end plate to the first hollow pressure vessel.

Outlets are provided for the overflow compartments. In the preferred embodiment, as shown in FIG. 4, the end plate 15 has two outlets 16, 17, corresponding to each of the overflow compartments 11, 12. However, it will be appreciated that an outlet could also be provided on the perimeter of the overflow plate 10 if necessary.

The end plate 15 has through holes 18 provided around its edge, which correspond to the holes 8 provided in the overflow flange 6 on the first hollow pressure vessel 2. A lug 19 with an eye-hook 20 fitted through it is located at the top for moving the end plate 15. Furthermore, an alloy weld overlay (not shown) is placed on the inner face of the end plate 15 to provide a metallic seating area for the packing material.

The end plate 15 is attached to the first hollow pressure vessel 2 via bolts 21, which pass through both the circumferentially placed holes 18 on the end plate 15 and the corresponding circumferentially spaced holes 8 on the overflow flange 6, which are secured by nuts 22.

The underflow plate 28 shown in FIG. 5 is located against the underflow flange 7 of the first hollow pressure vessel 2, the underflow plate 28 having a plurality of holes 31, which, ideally, correspond the holes 14 provided in the overflow plate 10, provided for the underflow outlet 27 of the cyclone liners 25 to pass through. An O-ring seal (not shown) is provided between the cyclone liners 25 and the underflow plate 28 to ensure that no liquid can pass by the outside of the cyclone liners 25.

The second hollow pressure vessel 32 is then seated against the underflow plate 28, holding the underflow plate 28 in place and creating underflow compartments 38, 39, as shown in FIG. 1. In the preferred embodiment 1, these compartments 38, 39 are formed by a hollow concentric pipe 41, substantially equivalent in diameter to the inner overflow compartment 12 being fitted inside the second hollow pressure vessel 32 and attached to the closed end of it, preferably being welded. At the open end of the second hollow pressure vessel 32 is a flange 33, which has holes 37 provided around its circumference, which correspond to the holes provided in the underflow flange 7 on the first hollow pressure vessel 2.

An alloy ring 40 is attached to the open end of the concentric pipe 41, preferably being welded. A groove is then shaped, preferably machined, into the end of the concentric pipe 41 and the alloy ring 40 and second hollow pressure vessel flange 33 are then machined together to achieve flatness. Packing material, for example an O-ring (not shown) is then fitted into this groove.

In the preferred embodiment 1, the second hollow pressure vessel 32 has an outlet 34 for the outer underflow compartment 38, an outlet 35 for the inner underflow compartment 39 and a drain outlet 36 for draining the second hollow pressure vessel 32. A lug 42 is provided for moving the underflow vessel 32.

The underflow plate 28, which seals against the packing material fitted in the groove in the concentric pipe 41 and thereby seals the compartments 38, 39 apart, is a solid plate. However, it will be recognized that it could also be shaped to have separate concentric recessed similar to and corresponding with the overflow plate 10. Furthermore, if the underflow plate 28 was shaped to have separate adjacent recesses, separated by a boundary wall, compartments 38, 39 could be created using an underflow end plate, similar to the overflow end plate 15, thereby eliminating the need for a second hollow pressure vessel 32.

As previously mentioned, it is preferred that the second hollow pressure vessel 32 be attached to the first hollow pressure vessel 2 by way of external bolting. Accordingly, in the preferred embodiment shown in FIG. 1, bolts 23 pass through both the circumferentially placed holes 9 on the underflow flange 7 and the corresponding holes 37 provided circumferentially on the second hollow pressure vessel flange 33 and are then secured by nuts 24. This arrangement has the benefit of providing more space inside the vessel to fit cyclone liners into.

In use, the pressure in the chamber formed inside the first hollow pressure vessel 2 by the overflow plate 10 and the underflow plate 28, is higher than that in both the overflow compartments 11, 12 and the underflow compartments 38, 39 because of the pressure drop caused by fluid flowing through the cyclone liners 25.

This pressure differential creates a force across the overflow plate 10, compressing the packing material sealing against the end plate 15, and a force across the underflow plate 28, compressing the packing material fitted into the groove at the end of the concentric pipe, thereby achieving a positive seal between the respective overflow compartments 11, 12 and underflow compartments 38, 39.

The overflow plate 10 is held in place between the first hollow pressure vessel 2 and the end plate 15, by the pressure exerted by the bolts 21 and the securing nuts, 22 securing end plate 15 to the overflow flange 6 on the first hollow pressure vessel. The underflow plate 28 is held between the second hollow pressure vessel 32 and the first hollow pressure vessel 2, by the pressure exerted by the bolts 23 and the securing nuts 24 securing the second pressure vessel flange 33 to the underflow flange 7 on the first hollow pressure vessel 2.

The operation of this apparatus will now be discussed in detail. An immiscible mixture of two fluids, in this example oil and water, enters the first hollow pressure vessel 2 via the inlet nozzle 5 under pressure. The fluid mixture then enters cyclone liners 25 through tangential involute inlets (not shown) located in the inlet chamber created inside the first hollow pressure vessel 2 between the overflow plate 10 and the underflow plate 28.

As the fluid flow is forced down the cyclone liner 25, it takes up a helical form along the cyclone liner's inner wall. It is accelerated in the conically reducing section, to the high velocities required to create the strong centrifugal forces that promote rapid separation. These velocities are maintained along the cyclone liner, frictional losses being offset by a gradual reduction in cross section area throughout the conical section.

The denser fluid moves to the walls of the cyclone liners 25 and is removed at the underflow outlet 27 located in an underflow compartment 38, 39. The less dense fluid is drawn into the low-pressure core, by applying a back-pressure to the outlet, flows back up the cyclone liners 25, to be removed at the overflow outlet 26 located in an overflow compartment 11, 12. When entering the cyclone liner 25, the fluid flow is directed into a vortex without disrupting the reverse flowing core.

The vortex and reverse flowing core, extend down into the tail section of the cyclone liners 25, increasing the residence time and allowing smaller, slower separating droplets to immigrate to the core. The total residence time in the cyclone liners 25 is in the order of a few seconds. The centrifugal force within the cyclone liners 25 is of the order of 1000 g. Hence, the cyclone liners 25 are insensitive to motion and orientation, making them particularly ideal for offshore applications in the oil industry.

The fabrication of the cyclone vessel 1 will now be explained in more detail, beginning with the overflow compartments 11, 12. In the preferred embodiment, the overflow compartments 11, 12 are created by a machined overflow plate 10 with concentric recessed compartments 11, 12 in which the cyclone liners 25 are installed. The overflow compartments 11, 12 are isolated by a seal formed by packing material (not shown), for example an O-ring, fitted into a groove machined into the boundary wall between the compartments on the overflow plate 10 that seats against the end plate 15.

The end plate 15 is held in place against the main vessel body flange 6 with external bolting 21, 22 that is not exposed to the process fluid. An alloy weld overlay (not shown) is placed on the inner face of the end plate 15 to provide an opposing sealing surface for the packing material. This design eliminates the circular bolt pattern and reduces the width of the sealing surface considerably.

An advantage provided by the arrangement described above is that the assembled cyclone apparatus 1 has no inaccessible compartments and no pressure boundary bolting that is exposed to the process fluids. Therefore it can be constructed in carbon steel and internally coated with a corrosion resistant lining. Furthermore, elimination of bolting and addition of the weld overlay allows the end plate 15 to also be constructed of carbon steel, thereby further reducing the cost of materials. In addition to this, reduction of the sealing area allows for an increase in the quantity of cyclone liners 25 that can be installed.

The underflow compartments 38, 39 are created with a concentric pipe 41 equivalent in diameter to the inner overflow compartment 12. The concentric pipe 41 is welded at one end to the closed end of the second hollow pressure vessel 32. An alloy ring 40 is then welded to the end of the concentric pipe 41. The alloy ring 40 and second hollow pressure vessel flange 33 are machined together to achieve flatness. A packing groove is machined into the top of the alloy ring 40. Packing material (not shown) is then installed and the second hollow pressure vessel flange 33 is bolted externally to the first hollow pressure vessel underflow flange 7.

This technology is principally applied to the separation of oil from produced water in oil production operations. Initial produced water quantities from an oil reservoir are typically very low with water production increasing over time. Therefore it is desirable to have an oil/water separation system that can accommodate a wide flow rate range starting at very low flow rates and increasing over time.

Previous systems accomplish this by designing a cyclone apparatus 1 with the capacity to hold a large number of cyclone liners 25. For low flow rate conditions, a small number of cyclone liners are installed in the cyclone apparatus, with the remaining holes being occupied by solid blank liners (not shown) which do not allow fluids to pass from the first hollow pressure vessel 2 to the overflow and underflow chambers. Increasing the capacity of the cyclone apparatus 1 is then accomplished by disassembling the cyclone apparatus 1 to replace blank liners with active cyclone liners 25.

It is, therefore, desirable to achieve a wider range of flow rates from a cyclone apparatus 1 without the requirement of disassembly to change the quantity of cyclone liners 25 within the cyclone apparatus 1. This is accomplished by the present invention by separating the overflow and underflow chambers into separate compartments 11, 12, 38, 39, each compartment 11, 12, 38, 39 having its own discharge nozzle 16, 17, 34, 35. Using valves on the discharge nozzle 16, 17, 34, 35 of each compartment 11, 12, 38, 39, the number of cyclone liners 25 through which fluids are allowed to pass can be varied providing multiple peak efficiency operating points for the cyclone liners apparatus 1.

To be more specific, in the embodiment shown in FIGS. 1, 3 and 6, the overflow compartments 11, 12 and the corresponding underflow compartment 38, 39 are arranged so that the inner compartments 12, 39 contain one third of the total number of cyclone liners 25, and the outer compartments 11, 38 contain two thirds of the total number of cyclone liners 25.

Accordingly, through control of the fluid flow that is allowed to pass through the outlets to the chamber, using, for example, a valve control system, the cyclone apparatus can be controlled to operate at a capacity of ⅓, ⅔, full, and increased capacity, depending upon how the cyclone apparatus 1 is operated. For ⅓ capacity operation, the smaller, inner compartments 12, 39 are used, for ⅔ capacity, the larger, outer compartments 11, 38 are used, and for full capacity operations, both chambers are used.

The above described arrangement allows for the cyclone apparatus to be operated with acceptable efficiency across a broad range of flow rates without the need to open the cyclone apparatus and change the quantity of cyclone liners.

It will be appreciated that the invention is not limited to the embodiment described above. For instance, there are a number of ways in which to create separate overflow and underflow compartments and, obviously, the number of compartments is not limited to two. Also, the number of cyclone liners in each different compartment can be changed, with the size, shape and number of compartments in a cyclone apparatus being varied accordingly.

Furthermore, the materials used to create the cyclone apparatus and its constituent components are not limited to carbon steel, as described above. Carbon steel is simply an example of a relatively cheap and viable material which has the necessary properties required of it.

In the drawings, the outlets 16, 17, 34, 35 to the separate overflow and underflow compartments 11, 12, 38, 39 are shown to be located on the end plate 15 and the second hollow pressure vessel 32. However, outlets could also be provided for on the overflow and/or underflow plates 10, 28 if desired.

For a mixture of oil and water, as explained above, the ratio of produced water to oil is high, which, in the preferred embodiment, leads to underflow compartments 38, 39 of relatively larger volume than overflow compartments 11, 12.

However, it will be appreciated that for a mixture of different fluids, in addition to a second hollow pressure vessel 32, it might be necessary to have a third hollow pressure vessel, instead of an end plate 15, to provide overflow compartments with a larger volume than those provided for by the end plate 15. Of course, as mentioned previously, it is also possible that there is also an end plate for creating underflow compartments or, indeed, any combination of these.

Securing the end plate 15 and the second hollow pressure vessel 32 to the first hollow pressure vessel flanges 6, 7 by external bolts 21, 23 and nuts 22, 24 is only the preferred method of doing so. It will be understood that these components could be secured together using other fixture methods or, indeed, they could even be secured internally, although, as mentioned above, this would limit the space available for cyclone liners 25 and perhaps make material selection more difficult.

The groove in the boundary walls separating the overflow and underflow compartments 11, 12, 38, 39, into which packing material is fitted, could be formed by methods other than machining and the packing material used could comprise any number of materials suitable for the task.

Control methods other than valves could also be used in the outlets 16, 17, 34, 35 to control flow through them, although valves are the most straightforward solution.

It will also be appreciated that the cyclone liners 25 used in the apparatus could also be replaced by blank liners, as in the prior art, to vary the number of cyclone liners 25 available for a particular compartment, although the advantage provided by the present invention, of having separate compartments which provide a range of flow rates within a cyclone apparatus without requiring disassembly of that apparatus, would still exist.

Of course, it will also be recognized that there are alternative ways of sealing the cyclone liners 25 in the overflow holes 14 and underflow holes 31. For example the holes 14, 31 could be tapped, with the cyclone liners 25, having corresponding threads, so that the cyclone liners 25 can be screwed into the holes 14, 31.

The invention claimed is:

1. A cyclone apparatus for separating a mixture containing at least one fluid and a further constituent based on the densities of the mixture constituents, the apparatus comprising:

a first hollow pressure vessel open at each end, the first hollow pressure vessel having at least one inlet;

an overflow plate positioned at an overflow end of the first hollow pressure vessel;

an end plate for sealing the overflow plate;

an underflow plate positioned at an underflow end of the first hollow pressure vessel; and a second hollow pressure vessel with one end being sealed against the underflow plate and another end being closed, wherein the overflow plate and underflow plate both being provided with through holes for supporting cyclone liners which pass there through, each cyclone liner having an inlet located between the overflow plate and the underflow plate; and wherein the overflow plate and the end plate are shaped such that the overflow plate and the end plate form separate adjacent overflow compartments between the overflow plate and the end plate, overflow outlets of the cyclone liners being located in the overflow compartments and each overflow compartment having an outlet; and wherein the underflow plate and the second hollow pressure vessel are shaped such that the underflow plate and the second hollow pressure vessel form separate adjacent underflow compartments between the underflow plate and the second hollow pressure vessel, underflow outlets of the cyclone liners being located in the underflow compartments, and each underflow compartment having an outlet.

2. The cyclone apparatus according to claim 1, wherein the overflow compartments are created by the overflow plate being formed to have separate adjacent recessed regions, separated by boundary walls, the recessed regions forming overflow compartments, when sealed against the end plate.

3. The cyclone apparatus according to claim 1, wherein the overflow compartments are created by the end plate being formed to have separate adjacent recessed regions, separated by boundary walls, the recessed regions forming overflow compartments, when sealed against the end plate.

4. The cyclone apparatus according to claim 2, wherein the end plate contains an outlet from an overflow compartment.

5. The cyclone apparatus according to claim 1, wherein the the end plate, is fixed flush against the overflow plate.

6. The cyclone apparatus according to claim wherein the 1, wherein the number of cyclone liners through which fluids are allowed to pass is controlled by controlling fluid flow through the outlets.

7. The cyclone apparatus according to claim 1, wherein valves are provided in the outlets of the overflow compartments and the underflow compartments for controlling the fluid flow through them.

8. The cyclone apparatus according to claim 1, wherein a partition wall is provided to the second hollow pressure vessel into sealed underflow compartments, the partition wall having an alloy strip attached to the edge, both the edge of the alloy strip and the second hollow pressure vessel flange then being machined together to achieve flatness.

9. The cyclone apparatus according to claim 2, wherein the separate adjacent recessed regions are concentric.

10. The cyclone apparatus according to claim 9, wherein the second hollow pressure vessel is separated into sealed underflow compartments by at least one hollow concentric pipe, whereby one end of the concentric pipe is sealed with the closed end of the second hollow pressure vessel and another end of the concentric pipe has an alloy ring both the alloy ring and the second hollow pressure vessel then being machined together to achieve flatness.

11. The cyclone apparatus according to claim 1, wherein the second hollow pressure vessel contains at least one outlet from and underflow compartment.

12. The cyclone apparatus according to claim 1, wherein the end plate is externally fixed to the first hollow pressure vessel.

13. The cyclone apparatus according to claim 1, wherein the second hollow pressure vessel is externally fixed to the first hollow pressure vessel.

* * * * *